United States Patent [19]
Paccione et al.

[11] 3,913,500
[45] Oct. 21, 1975

[54] HEAT TREATMENT OF WASTE SLUDGES

[75] Inventors: James Dennis Paccione, Glen Ellyn; David Moore O'Meara, Joliet, both of Ill.

[73] Assignee: Chicago Bridge & Iron Company, Oak Brook, Ill.

[22] Filed: May 1, 1974

[21] Appl. No.: 465,869

[52] U.S. Cl. ............ 110/8 F; 110/8 P; 110/15; 110/28 J
[51] Int. Cl.² ............................................. F23G 5/02
[58] Field of Search .......... 110/7 R, 8 R, 8 F, 15, 110/28 J, 8 P

[56] References Cited
UNITED STATES PATENTS

| | | |
|---|---|---|
| 3,319,586 | 5/1967 | Albertson et al. ............ 110/8 |
| 3,589,313 | 6/1971 | Smith et al. ................. 110/8 |
| 3,733,271 | 5/1973 | Olsen ........................ 110/15 |
| 3,779,181 | 12/1973 | Staffin et al. ............... 110/7 |
| 3,805,715 | 4/1974 | Keller ........................ 110/15 |
| 3,815,522 | 6/1974 | Larger ........................ 110/8 |

*Primary Examiner*—Kenneth W. Sprague
*Attorney, Agent, or Firm*—Merriam, Marshall, Shapiro & Klose

[57] ABSTRACT

The present invention relates to the disposal of sewage sludges or the like, by thermally conditioning the sludges, dewatering the sludges and subsequently incinerating the organic content of the sludges. More particularly the present invention is directed to a waste disposal process which employs the heat from the incineration step to condition the sludges, followed by dewatering the conditioned sludge in order to form a supra-autogeneous feed to the incinerator.

23 Claims, 1 Drawing Figure

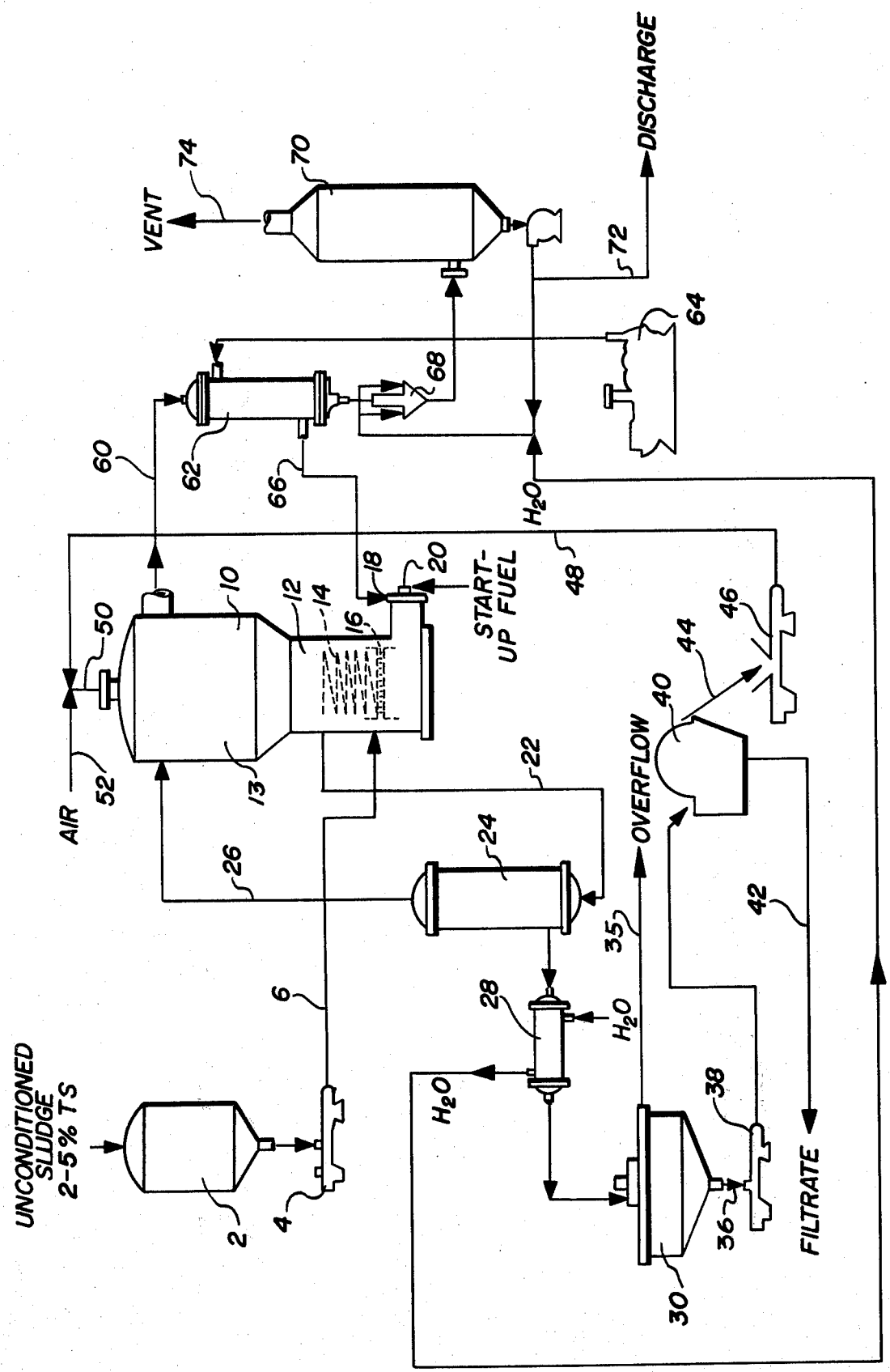

HEAT TREATMENT OF WASTE SLUDGES

BACKGROUND OF THE INVENTION

The present invention is concerned with the disposal of water-containing sludges or waste materials, wherein the solids content are largely combustible organic waste matter, typified by sludges which contain between 1 and 8 percent total solids, such as the sludges which frequently make up municipal and industrial wastes. Sludges which contain as much as about 95 percent water are difficult to incinerate because of their high moisture content, as the moisture must be evaporated or otherwise removed before the organic matter in the sludges can be incinerated.

Dewatering such high-moisture waste sludges is one of the most difficult problems in the field of waste treatment. The problems arise from the fact that municipal and industrial biological sludges are frequently colloidal systems which incorporate large amounts of bound water within a cellular structure. As a result, the sludges are highly compressible and do not dewater readily. For effective dewatering of such materials, some type of conditioning must be employed in order to destroy the cellular structure prior to the dewatering process.

The most commonly accepted conditioning method is chemical conditioning which consists of the addition of large amounts of inorganic or organic chemicals to coagulate and flocculate the sludge, resulting in a more readily dewaterable material. However, the cost of chemical conditioning is often expensive, and may range between 15 and 30 dollars or more per ton of dry solids treated. Additionally, the use of chemicals increases the quantity of material which must be handled. Further, the moisture content of chemically conditioned, dewatered sludges is high and typically ranges from 75 to 85%. The disadvantages of chemical conditioning have led to the suggestion of thermal conditioning by heat treating the waste sludges prior to dewatering.

The conditioning of sludges by heat treatment prior to dewatering have been described in the prior art, including U.S. Pat. Nos. 3,319,586; 3,580,193; and 3,697,417. In the thermal conditioning processes, the waste sludges are generally subjected to elevated temperatures and pressures, e.g., 200°C (392°F.) and 15–17 atmospheres (220–250 psia), and held at these conditions for a period of time necessary to obtain effective conditioning. The principle of thermal conditioning is based upon the fact that an organic sludge is a colloidal cellular system incorporating large amounts of bound water and soluble matter within gelatinous cells. The outside of the cell is a gelatinous sheath composed of protein and other organic material. By heating the sludge under pressure, the cell walls rupture and release the contained water by a phenomenon known as syneresis. After the collapse of the cellular structure the water can be separated from the solid materials by sedimentation, and the resulting dewatered slurry will contain 10 to 20 percent by weight of suspended solids. The dewatered slurry can be further dewatered by filtration, to produce filter cakes containing 35 to 70 percent by weight of solids.

The thermal conditioning processes described by the prior art utilize complex heat-exchangers (generally of the concentric tube type arrangement) to partially heat the raw sludge. Most of the prior art processes have used the hot, conditioned sludge as the heat transfer medium for heating the cold raw sludge, wherein the heat is exchanged in a complex sludge-to-sludge heat exchanger. Since the thermal driving force, the differential temperature ($dt$) in such heat exchange process is not too great [the conditioned sludge is at a temperature of about 200°C. (392°F.) as compared to the raw sludge which is at a temperature of about 20°C. (68°F.)] and the thermal driving force ($dt$) is typically less than 200°C. (392°F.), a large heat exchange area and a long time of contact is required to achieve the required temperatures.

The sludges which are treated by the present invention are in the form of aqueous slurries containing both dissolved and suspended solid organic matter. Such sludges have a tendency to scale or otherwise foul heat exchangers. Therefore it is extremely important to avoid any flashing or evaporation of the liquid portion of the sludges while the sludge is in the heat exchanger, since fouling and/or scaling of the heat exchanger is the usual result. The likelihood of scaling or otherwise fouling the heat exchanger system is influenced to some extent by the physical configuration and increased by the complexity of the heat exchanger itself, and the time required to pass the sludges through the heat exchanger. A great deal of scaling, plugging and fouling has been reported for the prior art units which require substantial heat transfer area. For this reason, some of the prior art, such as U.S. Pat. No. 3,697,417, provides for solvent washing of the heat exchangers "because sewage sludge tends to foul the heat exchangers" (col. 4, line 23).

Further, the prior art conditioning processes which use hot conditioned sludge to heat the raw cold sludge, cannot raise the cold sludge to the required temperatures without an additional source of heat. In most of the prior art processes, steam is added directly to the sludge at or prior to the holding vessel in which the sludge is conditioned. Alternatively, a second heat exchanger is used to heat the sludge to the conditioning temperature, but such heat exchangers require steam or some other form of energy. The need to generate steam requires a considerable capital expense and further operating expense, since it is necessary to purify water and to heat it to form the steam.

In order to overcome the tendency of sewage sludge to foul the heat exchangers, more complex types of heat exchangers have been devised, whereby an intermediate fluid is used to heat and cool the respective cold and hot sludges. While these systems have the advantage of eliminating a sludge-to-sludge heat exchanger, the thermal driving force ($dt$) is low and the scaling and fouling problem has not been obviated.

THE PRESENT INVENTION

The present invention overcomes the problems of the prior art devices, and accomplishes the thermal conditioning of sludges by directly heating the sludge in a heat exchanger which is at least partially submerged in a hot fluidized-bed reactor. Preferably, the fluidized-bed reactor is kept at temperatures in the range of 650° to 980°C. (1,200° to 1,800°F.). The sludge is heated to the desired conditioning temperatures through the use of the large thermal driving force (large $dt$), which rapidly heats the sludge to the desired temperature. The large thermal driving force permits the use of short and relatively simple heat exchangers, which minimizes operational difficulties and scaling tendencies.

The present invention further contemplates that the heated sludge is transferred to heat treatment reactor vessel where it is held for a sufficient time to accomplish the desired conditioning, after which the sludge is dewatered to produce an autogenous or supra-autogenous material which is incinerated in the fluidized-bed reactor without the addition of auxiliary fuel. When a supra-autogenous feed is incinerated in the fluidized-bed reactor, the excess thermal energy can be used in heating the waste slurry which is to be thermally conditioned. This results in a self-sustaining process wherein no auxiliary fuel is required and therefore energy is conserved.

The present invention involves the thermal conditioning of waste sludge by passing sludge, in heat exchange relationship, through the reaction zone of a fluidized-bed reactor, wherein the sludge is rapidly heated to the temperature required for thermal conditioning. In addition to facilitating the thermal conditioning of the sludge, the exchange of heat abstracts heat from the fluidized-bed reaction zone, which increases the capacity of the incinerator.

The present invention contemplates the incineration of increased quantity of sludge through the use of the heat exchanger to abstract heat from the fluidized-bed reaction zone. Generally, it is desired to operate any fluidized-bed reactor at as low a temperature as is reasonable, since better thermal efficiencies are obtained and the tendency to fuse the particles of the fluidized-bed material is reduced. For any desired temperature, there is an optimum rate at which fuel can be fed to a given installation, with an optimum ratio of fuel to air. The addition of fuel at higher than the optimum rate, has a tendency to increase the temperature. It has been found that by operating a heat exchanger within the fluidized bed, wherein heat is abstracted, the thermal capacity of the incinerator can be increased equivalent to the quantity of heat abstracted, while holding the fluidized-bed reactor at the desired temperature.

In order to provide sufficient oxygen for the combustion of the increased amount of sludge, the present invention contemplates the use of oxygen-enriched air or higher density bed material in the fluidized bed. Alternatively, in order to keep the velocity of the fluidizing gases from entraining the fluidized-bed particles, increased pressure in the fluidized-bed reactor can be used.

The heat exchanger used in the fluidized bed in the present invention may vary considerably in design. In designing the fluidized-bed heat exchangers to be used in the present invention, it is generally desirable to provide for heating of the sludge to the desired temperatures as rapidly as possible and residence times (the average time the sludge remains within the in-bed heat exchanger) of no more than about 25 seconds are preferred. Further, it is desired that the minimum velocity of the sludge as it passes through the heat exchanger positioned in the fluidized bed be at least 0.3 meters/second (one foot/second) with velocities of 1.8 to 3 meters/second (6 to 10 feet/second) being preferred. It is generally preferred that the flow of the sludge through this heat exchanger be turbulent, since turbulent flow improves heat transfer. In order to provide the desired sludge flow characteristics, it may be necessary to dilute the sludge with water. Diluting the sludge feed reduces the viscosities but increases the total volume of material. However, dilution may be advantageous since lower viscosities may produce turbulent flow which results in an improved coefficient of heat transfer.

In constructing the heat exchanger per se, it is desired to avoid sharp turns or complex bends, which provide eddy currents and permit accumulation of static portions of sludge, again which promotes the formation of scale. The surface finish of the interior of the tube of the heat exchanger may be smooth and planar, but some experimentation with rifled surfaces, in order to create turbulence and mixing, have been found desirable, since the turbulence results in better heat transfer properties. Generally it has been found that the heat transfer coefficient should be between about 227 and 454 $W/M^2-°C$. (40 and 80 $BTU/hr-ft^2-°F$.).

For purposes of the present invention, it is desired to condition the sludge at a temperature between about 180° and 220°C. (356° and 428°F.), at pressures elevated sufficiently to avoid flashing, for times between 30 and 90 minutes. Generally it has been found desirable to condition the sludge for about 45 minutes at a temperature of about 200°C. (392°F.). In accordance with the present invention, the sludge is heated in the heat exchanger, which is in heat exchange relationship with the fluidized bed, but little if any conditioning takes place in the heat exchanger. It is deemed important to transfer the heated sludge promptly from the heat exchanger into the heat treatment reactor, wherein the sludge is held at the requisite temperature and pressure for a time sufficient to accomplish effective conditioning.

DESCRIPTION OF DRAWING

A better understanding of the invention will be had by reference to the accompanying drawing, which shows a schematic flow diagram of a sewage treatment system, employing the process and apparatus of the present invention.

DETAILED DESCRIPTION OF THE INVENTION

The present invention is carried out by effecting the combustion of the sludge in a bed of inert hot granular material maintained in a state of fluidization by an oxygen containing gas which serves as the fluidizing gas. The hot granular bed is fluidized by the formation of a turbulent suspension of particles and upflowing stream of fluidizing gas. The dense turbulent suspension of particles is referred to herein as the fluidized bed.

The combustion, which is conducted in the fluidized bed, is accomplished under conditions which will oxidize the organic solids in a sludge to a stable gaseous mixture, with a large portion of the heat liberated by the combustion of the sludge used to flash off the moisture of the sludge, while also heating the combustion gases to bed temperatures high enough insuring complete odorless combustion, e.g., at least 650°C. (1,200°F.).

In the drawing, the fluidized-bed reactor is shown generally at 10. Within the fluidized-bed reactor is the fluidized bed 12, which during operation is the dense and turbulent suspension of inert granular particles. Within the fluidized bed is the heat exchanger coil 14 within which the sludge is heated.

The fluidized bed 12 of inert particles is maintained in an upflowing stream of fluidizing gas, which is supplied through distribution plate 16 or the like at the bottom of the bed. The fluidizing gas, which supplies the oxygen required for the combustion of the moist sludge, may be air or other oxygen-containing gas, such as enriched air. Preferably the fluidizing gas is preheated in heat exchanger 62, described below, and is fed through air input 18. Startup fuel or auxiliary fuel may be fed into the reaction chamber 10 by input line 20 or, if desired, the startup fuel or auxiliary fuel may be injected into the fluidized bed 12.

The dewatered moist sludge, containing from 30 to 70 percent by weight of solids, is preferably continuously fed into the reactor chamber 10 via sludge feed line 50, by spraying into the freeboard area 13. Alternatively, the sludge may be fed or injected directly into the fluidized bed 12. Various feed systems can be used, but it is essential that the sludge solids be fed into the turbulence of the bed 12 where the solids are subjected to rapid intermingling with the hot fluidized granular material. In this way complete, as well as odorless combustion is achieved directly in the presence of the heat storing and heat radiating inert granular particles, with the combustion proceeding at high speed.

In the drawing, the heat exchange coil 14 is positioned within the bed portion of the fluidized bed 12, and the sludge feed is overhead via line 50. It is possible to locate the coil in the freeboard area 13, above the bed 12, but in such a modification, it is essential to feed the dewatered sludge solids into the bed 12. Generally, it is preferred to locate the heat exchange coil 14 within the fluidized bed 12, as is shown in the drawing, since better heat transfer is obtained when the coil is within the bed proper.

As is shown in the drawing, unconditioned, raw sludge, preferably containing from 2 to about 8% by weight total solids is fed to a holding tank 2, from which it is pumped by pump 4 through sludge line 6 to the heat exchange coil 14. However, if the sludge viscosity is too high, scaling may take place in the tubes, which results in poor heat transfer. Under such circumstances, dilution of the feed with water is indicated.

In accordance with the present invention, a positive displacement pump is used as pump 4 in order to regulate the amount of feed to the system. It has been found that commercially available positive displacement, progressing cavity pumps, sold under the tradename Moyno, can be advantageously used in the present invention. By regulating the amount of feed fed to the system, the amount of feed fed through the heating coil 14, and the residence time of the sludge in the heating coil 14 can be regulated to raise the temperature and the pressure to the desired levels to accomplish the syneresis process. It is essential that the pressure in the heat exchange coil 14 be sufficiently high that no flashing of the sludge takes place in the coil, since scaling is the usual result.

In carrying out the present invention it is essential to have continuous flow through the heat exchanger at all times. For this reason, the positive displacement pumps described above are preferred. If, for some reason, the sludge feed stops, water should be promptly fed into the heat exchanger coil, whereby the problem with scaling and plugging which occurs when static sludge remains in the coil is avoided.

It is desirable, for purposes of insuring a continuous supply of sludge, to employ a holding tank 2.

The hot sludge which has been heated within the heat exchanger coil 14 is transferred via line 22 to the heat treatment reactor 24, where it is held for the time required to accomplish effective conditioning. While it is possible that a small amount of conditioning occurs in heat exchanger coil 14, it is desired that the sludge be passed through heat exchanger coil 14 as rapidly as possible, commeasurate with achieving the desired temperature and pressure conditions. As soon as the desired temperature is achieved, the hot sludge is directed to heat treatment reactor 24, where it is held under the appropriate temperature and pressure conditions for a time adequate to accomplish syneresis.

The sludge in heat treatment vessel 24 is held and maintained at an elevated temperature of about 200°C. (392°F.) and an elevated pressure, of about 15 atmospheres for about 45 minutes. It is contemplated by the present invention that the total conditioning time and conditions may be varied to suit the particular sludge being treated, as is described above.

The non-condensable gases, which comprise methane, ammonia, various hydrocarbons and the like, are stripped from the heat treatment vessel 24 via line 26 and are fed into the freeboard section 13 of the fluidized-bed reaction chamber 10, where they are thermally oxidized to $CO_2$, $N_2$ and water. This thermal decomposition effectively destroys any odors from all gases evolved during the conditioning of the sludge.

The conditioned sludge emerging from heat treatment vessel 24 is fed through heat exchanger 28 and then into a sedimentation vessel 30. It is desirable to cool the conditioned sludge emerging from heat treatment reactor 24 to avoid flashing and gas formation in the sedimentation vessel 30, and for this purpose, heat exchanger 28 has been provided. Heat exchanger 28 employs water as the cooling media. As is shown in the drawing, the water emerging from heat exchanger 28 can be used as makeup water for the venturi scrubber 68. Alternatively, the conditioned sludge may be cooled by the addition of water directly to the sludge. While this increases the amount of material which must be handled, it is an effective mechanism for cooling the conditioned sludge, and may be used in place of or to supplement heat exchanger 28.

The conditioned, cooled sludge is fed to sedimentation vessel 30. Preferably the sedimentation vessel is sealed in order to prevent any odors from escaping. The sedimentation vessel 30 may be operated under pressure and the off gases may be vented to the freeboard section of the fluidized-bed reactor, (by a line not shown) where the gases are thermally decomposed and any odors therein are destroyed. The overflow 35 from sedimentation vessel 30 is returned to the sewage treatment plant for conventional sewage treatment, or is treated separately prior to being recycled to the treatment plant.

The underflow or sediment 36 from sedimentation vessel 30 is a slurry which typically contains from 10 to 20 percent total solids. The underflow sludge slurry 36 is preferably pumped by pump 38 to a vacuum filter 40. The filtrate from the vacuum filter 40 is also returned to the sewage treatment plant or separately treated with overflow 35 from sediment vessel 30. The filter cake 44 from filter 40, which typically contains from 30 to 70 percent total solids, is discharged to the hopper of the sludge feed pump 46 where it is pumped via sludge feed line 48 through sludge feed inlet 50. As was mentioned above, it is possible to introduce the sludge feed into the fluidized bed 12, but it is preferred to introduce the sludge feed into the freeboard area 13, preferably by spraying from an overhead feed inlet 50. Advantageously, the spraying operation may be improved by using compressed air to disperse the sludge feed as is illustrated by line 52 of the drawing.

The exhaust gases emerge from the fluidized-bed reactor 10 via line 60 where they are preferably fed through heat exchanger 62. Heat exchanger 62 may be used to preheat air from air blower 64. The preheated air from heat exchanger 62 may be then fed via line 66 to the fluidizing air input 18.

The exhaust gases emerging from heat exchanger 62 are fed through a Venturi scrubber 68 into an entrainment separator 70 where any remaining solids are separated from the exhaust gases. As is shown in the drawing, cooling water from heat exchanger 28 can be used as makeup water in the Venturi scrubber 68. The clean exhaust gases 74 are vented, while the solids are discharged through line 72.

The following example, which refers to the drawing, will serve to illustrate the operation of a typical installation for heat treatment of waste sludges, but it is understood that this example is merely set forth for illustrative purposes and many other operating conditions are within the scope of the present invention.

EXAMPLE 1

Unconditioned anaerobically digested sludge, at a 5 percent total solids concentration and a temperature of 21.1°C. (70°F.), was continuously pumped from holding tank 2 by means of a positive displacement progressing cavity pump 4 at a rate of 907 kg/hr (2,000 lbs/hr). The sludge was transferred via line 6 to the heat exchange coil 14 located within the fluidized bed 12. In the fluidized bed 12, which was maintained at a temperature of 760°C. (1,400° F.), sufficient heat was transferred from the bed through the heat exchange coil 14 to the sludge feed to raise the temperature of the feed to 204°C. (400°F.) at a pressure of 16.7 atmospheres (245 psia). The sludge moved through the heat exchange coil at about 0.9 meters/second (3 feet/second) and had a residence time of about 15 seconds.

The heated sludge was then transferred via line 22 to the heat treatment reactor 24 where it was retained at a temperature of 200°C. (392°F.) and a pressure of 15.3 atmospheres (225 psia) for approximately 45 minutes. The sludge then flowed from the heat treatment reactor 24 to the cooling heat exchanger 28 where it was cooled to a temperature of 51.7°C. (125°F.).

The noxious and odorous gases generated in the heat treatment reactor 24 during the heat treatment process were vented via line 26 to the freeboard section of the fluidized-bed reactor 10 where they were thermally decomposed thereby destroying the noxious and odorous characteristics of the gases.

The cooled sludge from the heat exchanger 28 was transferred to the sedimentation vessel 30 where it settled to a concentration of 20 percent total solids. The settled sludge was pumped from the sedimentation vessel 30 by means of positive displacement progressing cavity pump 38 into the bed section 12 of the fluidized-bed reactor 10 (feed line not shown in figure) at a rate of approximately 340 kg/hr (750 lbs/hr). The settled sludge was not mechanically dewatered, but was fed directly into the bed 12 of the fluidized bed 10 where it was incinerated at a temperature of 760°C. (1,400°F.) and thermally decomposed to carbon dioxide, water and a sterile, non-pollutive ash. Since the sludge contained about 80 percent water, it was necessary to use an auxiliary fuel (No. 2 fuel oil).

The untreated anaerobically digested sludge had a terminal settling density of 7 percent total solids (as determined by settling a sample in a cylinder for 24 hours, and measuring the resulting concentration); after chemical conditioning it could be dewatered to a total solids concentration of only 22 percent by vacuum filtration. After heat treatment as typified by the example, a terminal settling density of 20 percent total solids could easily be achieved and further dewatering by mechanical means resulted in a filter cake containing 45 to 65 percent of total solids without the addition of conditioning chemicals.

The present invention contemplates many variations to the apparatus as shown and described herein, which variations may alter the apparatus or the control mechanisms by which the process is carried out. For instance, if the heat value of the sludge feed is sufficient it may be unnecessary to use vacuum filter 40 to raise the solids level of the sludge feed to as high as 40 percent. In such cases the present invention contemplates taking the underflow from the sedimentation vessel and feeding it directly to the reaction chamber 10 via sludge feed inlet 50. Such a modification might require the use of some auxiliary fuel 20, but under certain conditions, it may be more economical to use auxiliary fuel than to install a filtration system.

Alternatively, the present invention contemplates the use of a centrifuge as the mechanism for dewatering. In other words it is contemplated that a centrifuge could take the place of the sedimentation vessel 30 and the vacuum filter 40.

As was mentioned above, the positioning of the heat exchange coil 14 within the fluidized bed functions to abstract heat from the fluidized-bed reactor 10, and in this way, the incineration temperatures within the reactor 10 can be controlled within the range of 650° to 980°C. (1,200° to 1,800°F.), which is the overall operable range. It is preferred to keep the incineration temperature between 700° and 760°C. (1,300° and 1,400°F.). The heat treatment temperature, that is the temperature to which the sludge in the heat exchanger coil 14 is heated or the capacity of the heat treatment system can be varied by controlling the fraction of the heat exchange coil 14 which is submerged in the fluidized bed 12. The submergence can be controlled by varying the bed level in the reaction chamber, which can be accomplished by varying the amount of the inert bed material in the fluidized bed. In this way, the feed may be varied by as much as 25 percent from the design capacity.

The capability of the incinerator to utilize higher solids feed can be increased by removing heat directly from the bed. This enables the operation of the bed within the desired temperature range without the necessity of introducing energy wasting cooling water. Since the high latent heat content of water vapor in the exhaust gas in unrecoverable at useful levels, the production of exhaust gas with lower water content can provide for useful recovery of energy.

The feed sludge which is treated by the present invention may vary over wide limits. The present invention contemplates the use of mixed sludges in the heat treatment and incineration process as well as individual sludges. Those skilled in the art will be aware that the operating conditions might vary depending upon the nature of the sludge being treated. Further, it has been found that alum sludge can be heat conditioned and filtered using the present invention.

The forms of invention herein shown and described are to be considered only as illustrative. It will be apparent to those skilled in the art that numerous modifications may be made therein without departure from the spirit of the invention or the scope of the appended claims.

What is claimed is:

1. A method of incinerating high moisture sewage sludge which comprises:
    providing a combustion chamber containing a body of hot inert granular material having heat-storing and heat radiating capability;
    supplying an oxygen containing fluidizing gas to said granular material in order to form a fluidized bed thereof;
    continuously feeding high moisture sewage sludge through a heat exchange means located in heat exchange relationship with said fluidized bed, whereby said sludge is heated to an elevated temperature and an elevated pressure;
    holding said heated sludge at an elevated temperature and an elevated pressure for a time sufficient to permit effective conditioning;
    dewatering said conditioned sludge to raise the solids level to at least 10 percent by weight;
    feeding said dewatered sludge into said fluidized bed, wherein said sludge is incinerated.

2. A method, as described in claim 1, wherein said high moisture sludge contains from about 1 to about 8 percent solids, by weight.

3. A method, as described in claim 1, wherein said bed is maintained at a temperature of from about 650° to 980°C.

4. A method, as described in claim 1, wherein the residence time of said sludge in said heat exchange means is no more than about 25 seconds.

5. A method, as described in claim 1, wherein said sludge passes through said heat exchange means at a velocity between about 0.3 and 3.0 meters per second.

6. A method, as described in claim 1, wherein said sludge in said heat exchange means is heated at a pressure high enough to avoid flashing in said heat exchange means.

7. A method, as described in claim 1, wherein said conditioning temperature is between about 180° and 220°C.

8. A method, as described in claim 1, wherein said heated sludge is conditioned for between 30 and 90 minutes.

9. A method, as described in claim 1, wherein said dewatered sludge has a solids content of at least 30 percent.

10. A method, as described in claim 1, wherein said conditioned sludge is dewatered by sedimentation.

11. A method, as described in claim 1, wherein said conditioned sludge is dewatered by filtration.

12. A method, as described in claim 1, wherein said conditioned sludge is dewatered by centrifugation.

13. An apparatus for heat treatment and incineration of high moisture sewage sludges containing from about 1 to about 8 percent solids which comprises:
    a fluidized-bed reactor having heat exchange means therein;
    said heat exchange means adapted to continuously heat high moisture sludge to elevated temperatures and elevated pressures;
    means to hold said sludge at elevated temperatures and elevated pressures for a time sufficient to effectively condition said high moisture sludge;
    dewatering means in fluid communication with said sludge holding means, said dewatering means adapted to raise the solids level of said conditioned sludge to at least 10 percent by weight, and
    means to continuously feed said dewatered sludge to the reaction zone of said fluidized bed whereby said sludge is incinerated.

14. An apparatus as described in claim 13, wherein said heat exchanger is located within the bed of said fluidized-bed reactor.

15. An apparatus as described in claim 13, wherein sludge is supplied to said heat exchange means by a positive displacement pump.

16. An apparatus, as described in claim 13, which includes means to supply water to said heat exchange means when the supply of sludge becomes inadequate.

17. An apparatus as described in claim 13, which includes pressure control means for said heat exchange means adapted to hold the pressure in said heat exchange means high enough to avoid flashing therein.

18. An apparatus as described in claim 17, wherein said pressure control means controls the pressure in said sludge holding means.

19. An apparatus as described in claim 13, wherein said dewatering means comprises a sedimentation chamber.

20. An apparatus as described in claim 13, wherein said dewatering means comprises a filter.

21. An apparatus, as described in claim 13, wherein said dewatering means comprises a centrifuge.

22. An apparatus, as described in claim 13, wherein said dewatering means raise the solids level of said conditioned sludge to from about 30 to about 70 percent by weight.

23. A method as described in claim 1 wherein said dewatered sludge is supra-autogeneous.

* * * * *